United States Patent [19]
Yasumaru et al.

[11] Patent Number: 5,662,523

[45] Date of Patent: Sep. 2, 1997

[54] GAME APPARATUS USING A VIDEO DISPLAY DEVICE

[75] Inventors: Shingo Yasumaru; Kazunari Shimamura; Nobuyuki Takano, all of Tokyo, Japan

[73] Assignee: Sega Enterprises, Ltd., Tokyo, Japan

[21] Appl. No.: 499,298

[22] Filed: Jul. 7, 1995

[30] Foreign Application Priority Data

Jul. 8, 1994 [JP] Japan .................................. 6-157238

[51] Int. Cl.⁶ .................................................. A63G 31/16

[52] U.S. Cl. .................... 463/30; 463/32; 434/55; 434/307 R; 345/8; 273/DIG. 17; 472/60; 472/70; 472/130; 472/59

[58] Field of Search ...................... 463/5–7, 1–2, 463/30–31, 34–38, 49, 51–52; 273/148 B, DIG. 17, DIG. 28; 434/29, 55, 43, 307 R, 58, 365, 62; 455/6.3; 446/230–231; 345/3–6, 8; 472/59–61, 68, 70, 130, 133, 135; 340/500, 515, 540, 323 R; 395/152, 154; 359/458, 462; 353/7–8

[56] References Cited

U.S. PATENT DOCUMENTS

| | | | |
|---|---|---|---|
| 4,477,069 | 10/1984 | Crudgington, Jr. . | |
| 4,542,291 | 9/1985 | Zimmerman . | |
| 4,688,105 | 8/1987 | Bloch et al. | 360/55 |
| 4,710,873 | 12/1987 | Breslow et al. | 463/31 |
| 4,905,147 | 2/1990 | Logg | 463/2 |
| 4,976,438 | 12/1990 | Tashiro et al. . | |
| 4,988,981 | 1/1991 | Zimmerman et al. . | |
| 4,998,199 | 3/1991 | Tashiro et al. | 463/29 |
| 5,049,079 | 9/1991 | Furtado et al. | 482/902 |
| 5,130,794 | 7/1992 | Ritchey | 348/383 |
| 5,240,416 | 8/1993 | Bennington | 434/59 |
| 5,300,921 | 4/1994 | Hoch et al. | 434/247 |
| 5,316,480 | 5/1994 | Ellsworth | 434/29 |
| 5,364,270 | 11/1994 | Aoyama et al. | 463/30 |
| 5,382,026 | 1/1995 | Harvard et al. | 463/34 |
| 5,388,990 | 2/1995 | Beckman | 434/307 R |
| 5,415,549 | 5/1995 | Logg | 434/307 R |
| 5,423,554 | 6/1995 | Davis | 463/31 |
| 5,490,784 | 2/1996 | Carmein | 434/55 |
| 5,495,576 | 2/1996 | Ritchey | 395/154 |
| 5,553,864 | 9/1996 | Sitrick | 463/31 |

OTHER PUBLICATIONS

The Washington Times, "Interactive Computer Graphics Allow Trips To New Realities", by Gayle Hanson, Apr. 12, 1991, p. B7.

"Interactivity and Individual Viewpoint in Shared Virtual Words: The Big Screen vs. Networked Personal Displays", by W. Robinett et al., Computer Graphics, vol. 28, No. 2, May 1994.

"A Virtual Cockpit for a Distributed Interactive Simulation", by W. Dean McCarty et al., IEEE Computer Graphics and Applications, vol. 14, No. 1, Jan. 1994.

Primary Examiner—Jessica Harrison
Assistant Examiner—Mark A. Sager
Attorney, Agent, or Firm—Price, Gess & Ubell

[57] ABSTRACT

The present invention relates to a game apparatus using a video display device especially a game apparatus that displays an interactive video with a co-driver, particularly a virtual reality video. The game apparatus having a video display device of the present invention comprises, as the basic elements, a plurality of video display devices for displaying a video watched by each of the plurality of players, a plurality of player control units for controlling the video display of the corresponding video display device and an position sensor device for detecting the positions or the movements of the players. Base on the position information of one player detected by the position sensor device, the player control units for the other players control the corresponding video display device to give some change to the displaying video watched by the other players.

25 Claims, 12 Drawing Sheets

(1)

(2)

(1)

(2)

GAME APPARATUS USING A VIDEO DISPLAY DEVICE

BACKGROUND OF THE INVENTION

1. Field of the Invention

The present invention relates to a game apparatus using a video display device, especially a game apparatus that displays an interactive video with a co-driver, particularly a virtual reality video.

2. Description of Related Art

Theme parks or game arcades are built at various cities. Many game apparatuses imitating a vehicle and having a player enjoy them through certain movement thereof are developed and installed in the theme parks and game arcades as their attractions. Among the game apparatuses, there is a game apparatus that builds in a video display device and that provides a vehicle boarded by the player with a certain movement coupled with the displaying video. In the conventional game apparatuses, however, although a plurality of players board on the imitated vehicle, all players are forced to see a common video display and enjoy a common movement of the vehicle coupled with the common display video.

There is also a game apparatus that installs a video game device therein as the video display device and provides the players with a game during their ride. Further, there is a game apparatus that a virtual reality video game is built in and that provides the players with the virtual reality of more realistic vehicle movement. In these game apparatuses, however, although a plurality of players board on the vehicle, they only watch a commonly displayed video and enjoy a common game story. That is, in either the case of a single player or the of a plurality of players, each player experiences the common content or game story. Therefore, even in the that a plurality of players on board an imitated spaceship at the same time and are playing a war game of fighting a space enemy, an operation or a conduct of one player can not give any change or effect to the video and movement for the other players.

SUMMARY OF THE INVENTION

It is an object of the present invention to provide a game apparatus having a video display device that displays a virtual reality video and being able to provide each player with a more realistic virtual reality.

It is another object of the present invention to provide a game apparatus on which plural players are on board and in which the operation and conduct of one player can give an effect to the displayed video for the other players.

It is an additional object of the present invention to provide a game apparatus having a circuit that can effectively transfer the player's conduct from one player to the other players so that one player's conduct can give an effect to the video picture in the video display for the other players.

The game apparatus having a video display device of the present invention comprises, as the basic elements, a plurality of video display devices for displaying a video watched by each of the plurality of players, a plurality of player control units for controlling the video display of the corresponding video display device and a position sensor device for detecting the positions or the movements of the players. Base on the position information of one player detected by the position sensor device, the player control units for the other players control the corresponding video display device to give some change to the displaying video watched by the other players.

In addition to the above structure, the game apparatus of the present invention comprises head mounted display devices for each player. The video display device is installed in the head mounted display device and have a pair of tiny monitors in front of each eye of the player.

Further, the position sensor device for detecting the positions of the plural players has a position information generation device installed in each head mounted display device of each player. The position information generation device generates detected output which includes a change of the crossing direction in a predetermined magnetic field based on a movement of the player. The position sensor device detects the movement of the players' position based on the detected output from the position information generation device. Thus, when the player moves its head to the other player, the position or the movement of the players position can be detected.

Further, with respect to the position situation, the plural player control units are connected in tandem through communication lines. The position information of each player detected by the position sensor device is sent to the player control units through the communication lines sequentially. According to the structure, the plural player control units can recognize the position information of the other players in a simple manner.

Further, each of the pair monitors displays video based on video data of two-dimensional coordinates which is converted from polygon data of three-dimensional coordinates through projection of the polygon data on a two-dimensional plane perpendicular to a cone of vision for each vantage point of the eyes. Accordingly, each player can recognize the displaying video as virtual reality three-dimensional picture.

Further, each of the plural player control units comprises a first control device and a second control device. Each of the first and second control devices has ROM(Read Only Memory) that contains a game program, CPU(Central Processing Unit) that executes and control the game program and video RAM(Random Access Memory) so that the first and second control devices control the video display of the corresponding monitor according to the game program. According to this structure, the video game device is built in the game apparatus so that the player can experience not only the video picture but also the contents of the video game in virtual reality sense through the game apparatus.

DETAILED DESCRIPTION

Figure 1:
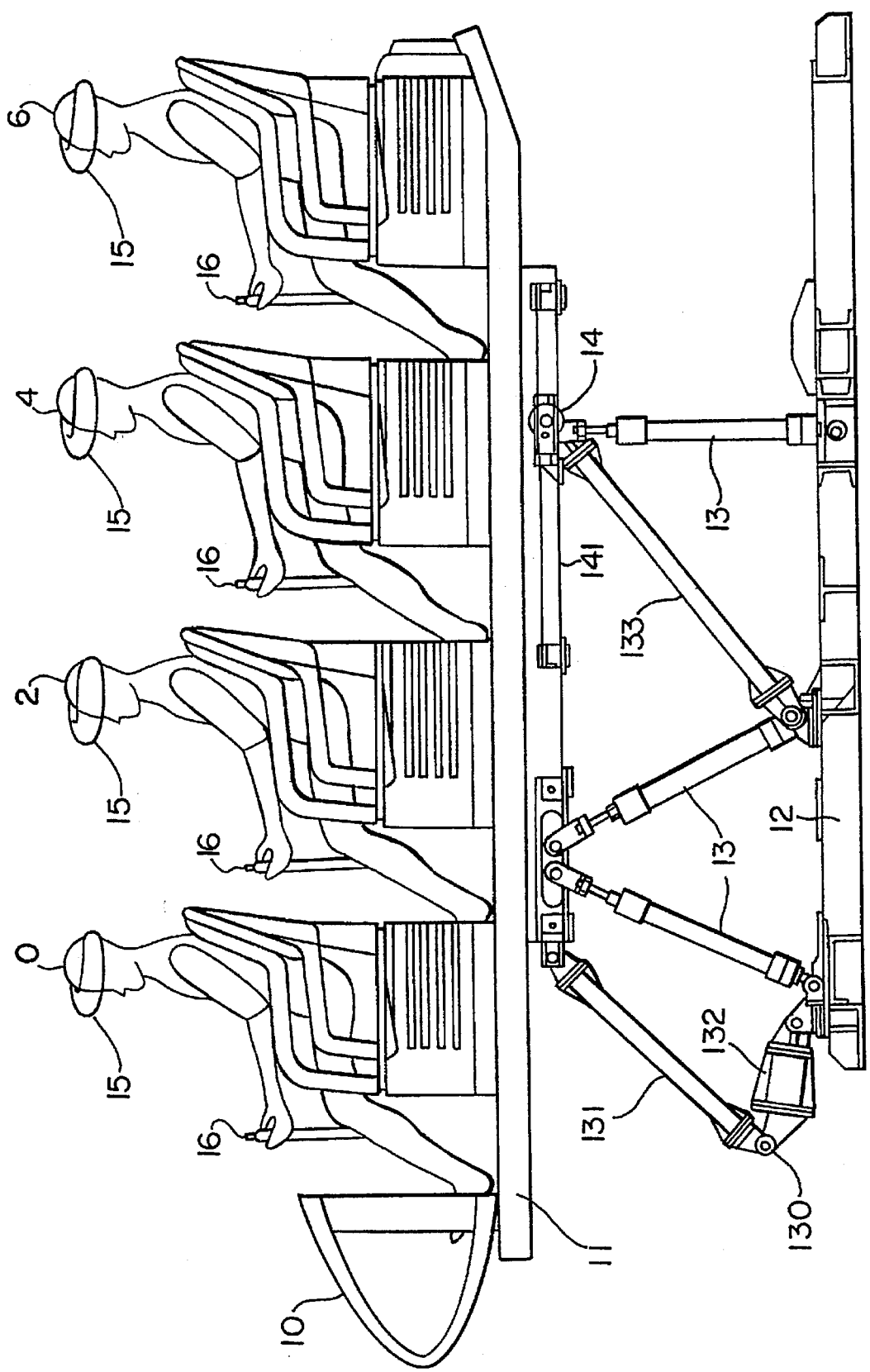
FIG. 1 is an overview of the game apparatus where the present invention is applied.

The present invention will now be described more fully with reference to accompanying drawings, in which an illustrative embodiment of the invention is shown. This invention can, however, be embodied in many different forms and the present invention should not, therefore, be construed as being limited to the embodiment set forth herein. Rather, the specific embodiment which is illustrated and described herein is provided for purposes of illustration and in order to fully convey to those skilled in the art the broad scope of this invention and how it is capable of being used.

In the drawings, the same reference numbers are used to denote corresponding or identical components.

FIG. 1 is a side overview of the game apparatus using virtual reality video device as the embodiment of the present invention. For the purpose of simplify, a portion of the outside elements are deleted.

In FIG. 1, 10 is the front of the vehicle imitating a spaceship and 0, 2, 4 and 6 are the players. Although 4 players 0, 2, 4, 6 are drawn, another 4 players 1, 3, 5, 7 are on board on each next seat so a total 8 players can be on board the vehicle. 11 is a bottom plate and 12 is a base. The bottom plate 11 and the base 12 are connected through link elements 131–133 and plural hydraulic cylinders 13.

Further, 130 is a joint for connecting the link elements 131 and 132. And 141 is an axis through which a shaking element 14 is provided to permit the vehicle to be able to be shaken. The link elements 131–133 and the hydraulic cylinders 13 provided between the bottom plate 11 and the base 12 are the same as ones shown in Japanese Utility Model Laid Open publication, Jikkaihei 4-60286, FIG. 2. And each hydraulic cylinder 13 expands and contracts in order to incline back and forth, right and left and move forward and backward the spaceship according to oil pressure from a oil pressure distribution control device that is controlled by a control device not shown in FIG. 1. That is, the hydraulic cylinders 13 give the movement of pitching, rolling and acceleration to the vehicle so that the players can experience the movement of the spaceship.

Figure 8:
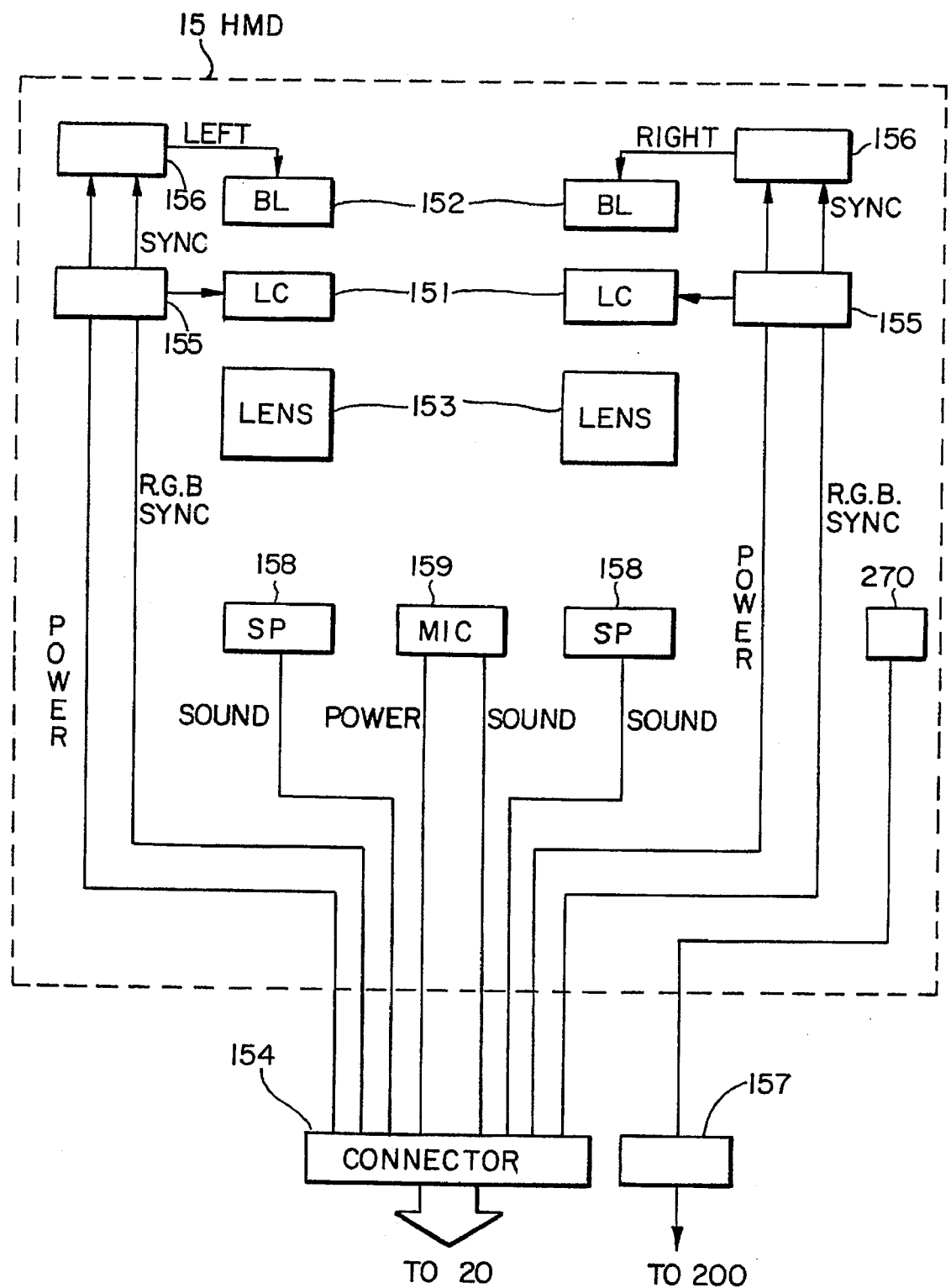
FIG. 8 is a block diagram of the head mounted display device in the embodiment of the present invention.

Head mounted display devices 15 are mounted on each head of the players 0–7 and cover each eyes. The head mounted display device 15, hereinafter described as HMD if necessary, includes an output device of video picture and voice and an input device of the voice for each player in a control system explained later. The head mounted display device 15 includes, as shown in FIG. 8 later, a pair of monitors, e.g. color liquid crystal displays (LCD), provided in front of each eye of the player, a pair of speakers for outputting stereo sound and a microphone therein. The LCD can be a small CRT (Cathode Ray Tube) as an alternative monitor.

A pair of video pictures with a difference in the parallax eyes is displayed in the pair of color LCD as explained later so that the player can recognizes a three-dimensional picture by watching through both eyes. Further, since the monitors are provided for both right and left eyes, the video picture is widened.

Further, 16 is a key input imitating a control stick with a push button on the top. In a game, the player pushes the button when shooting an enemy.

Figure 2:
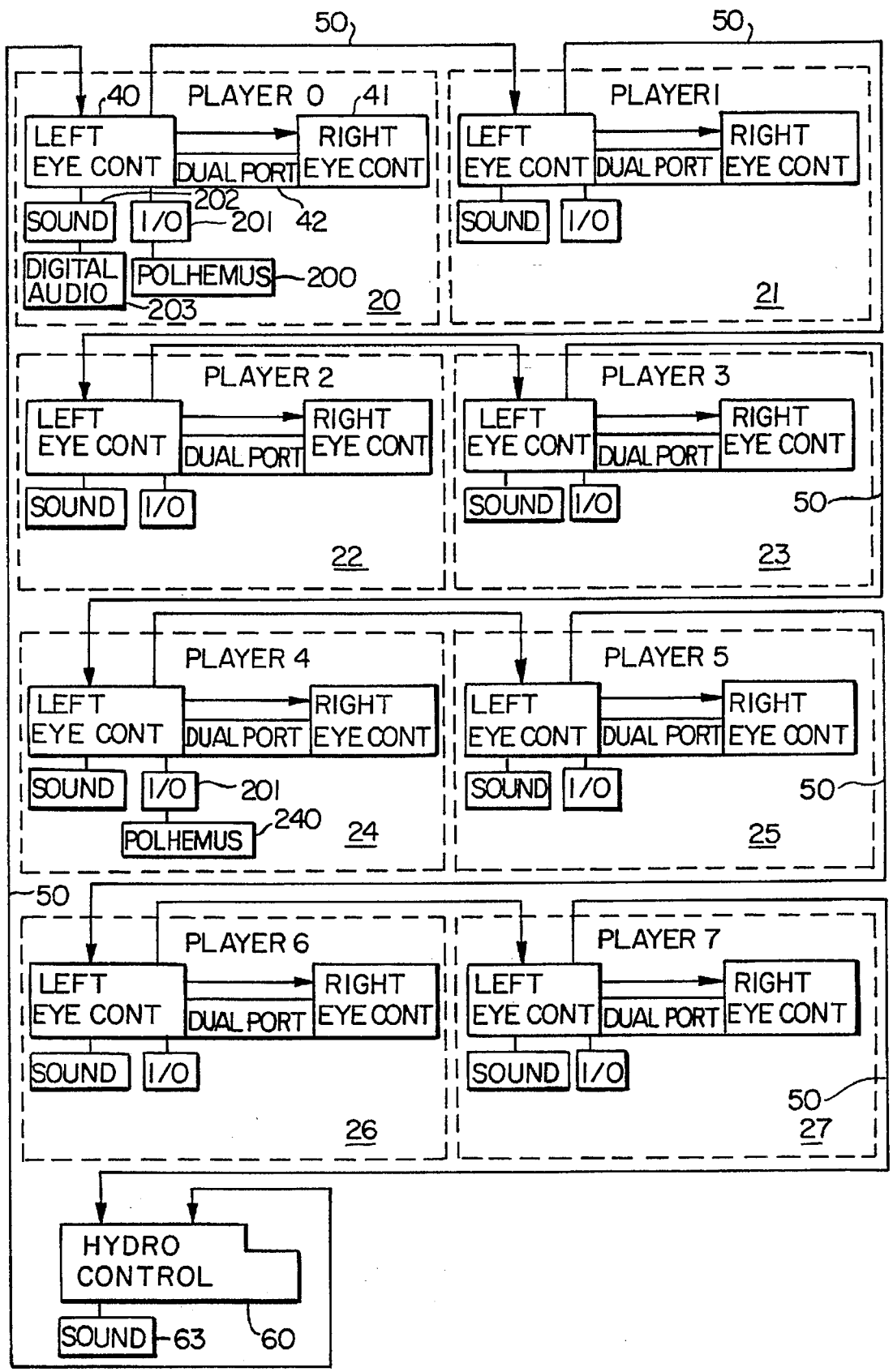
FIG. 2 is a control system chart of an embodiment of the present invention.

FIG. 2 is a control system chart in the embodiment of the present invention for displaying video and outputting voice and sound to 8 players and for controlling the spaceship movement.

In FIG. 2, 20–27 are player control units provided for each of the 8 players respectively which are installed in each box under the seat of each player. Further, 60 is the hydraulic control unit that controls the pitching, rolling and moving forward and backward of the spaceship in synchronous to the controlled operation of the player control units 20–27. The player control units 20–27 are all same structure except for the unit 20 and 24 having position sensor unit 200, 240 and the unit 20 having digital audio device 203. However, the position sensor units 200, 240 may be provided at the outside of the player control units 20, 24. In that case, the position sensor units 200, 240 are installed in between the players' seats.

Explaining the player control unit 20 as the representative, the unit 20 includes a first control device 40 for controlling the color LCD for the left eye and a second control device 41 for controlling the color LCD for the right eye therein which are provided in the head mounted display device 15. The first control device 40 and the second control device 41 communicate to each other in their signals through dual port RAM 42. Further, the first control device 40 is connected to the sound circuit 202 and the digital audio circuit 203 and also to the position sensor unit 200 through I/O circuit 201. The function of these peripheral circuits connected to the first control device 40 is explained later.

Further in FIG. 2, arrow lines 50 connecting the control units are signal lines or communication lines. The signal lines 50 connects each control unit in tandem through outputting from the hydraulic control unit 60 that controls the pitching and rolling, connecting each player control units 20–27 and returning to the hydraulic control unit 60. In each player control units 20–27, the signal from the signal line 50 is branched off at the first control device 40 for the left eye and sent to the second control device 41 for the right eye through the dual port RAM 42.

Figure 3:
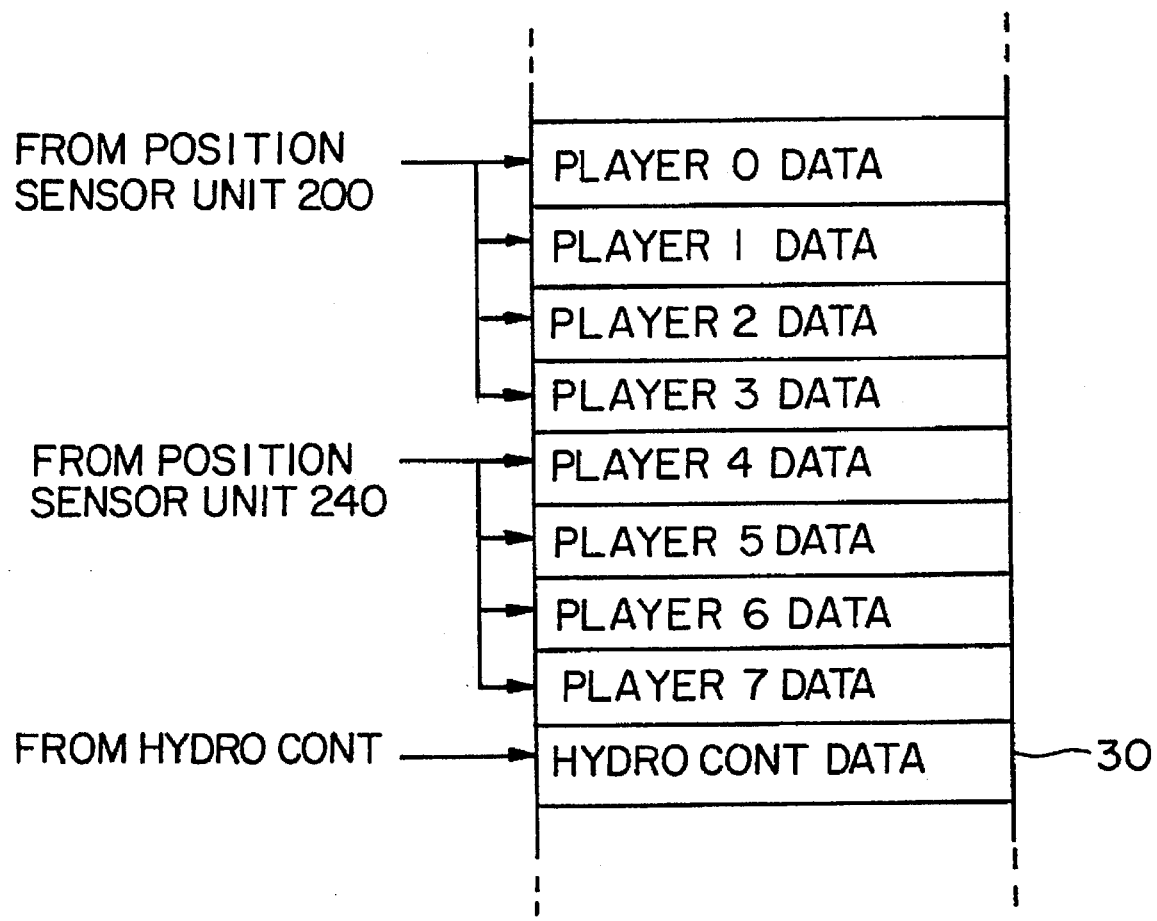
FIG. 3 is a drawing that shows a format example of a signal being sent out on a signal line 50 in an embodiment of the present invention.

FIG. 3 shows the format of the signal carried on the signal line 50. As shown in the figure, the inserting positions of each data of the players 0–7 are defined in a packet form. These data in packet form are carried out in the signal line 50 repeatedly. As explained later, the position information of the players 0–3 is inserted from the first position sensor unit 200 through I/O circuit 201. Simultaneously, the position information of the players 4–7 is inserted from the second position sensor unit 240 through I/O circuit 201. The control signal for driving the hydraulic control unit 60 is also inserted in the signal as packet data thereof.

Figure 4:
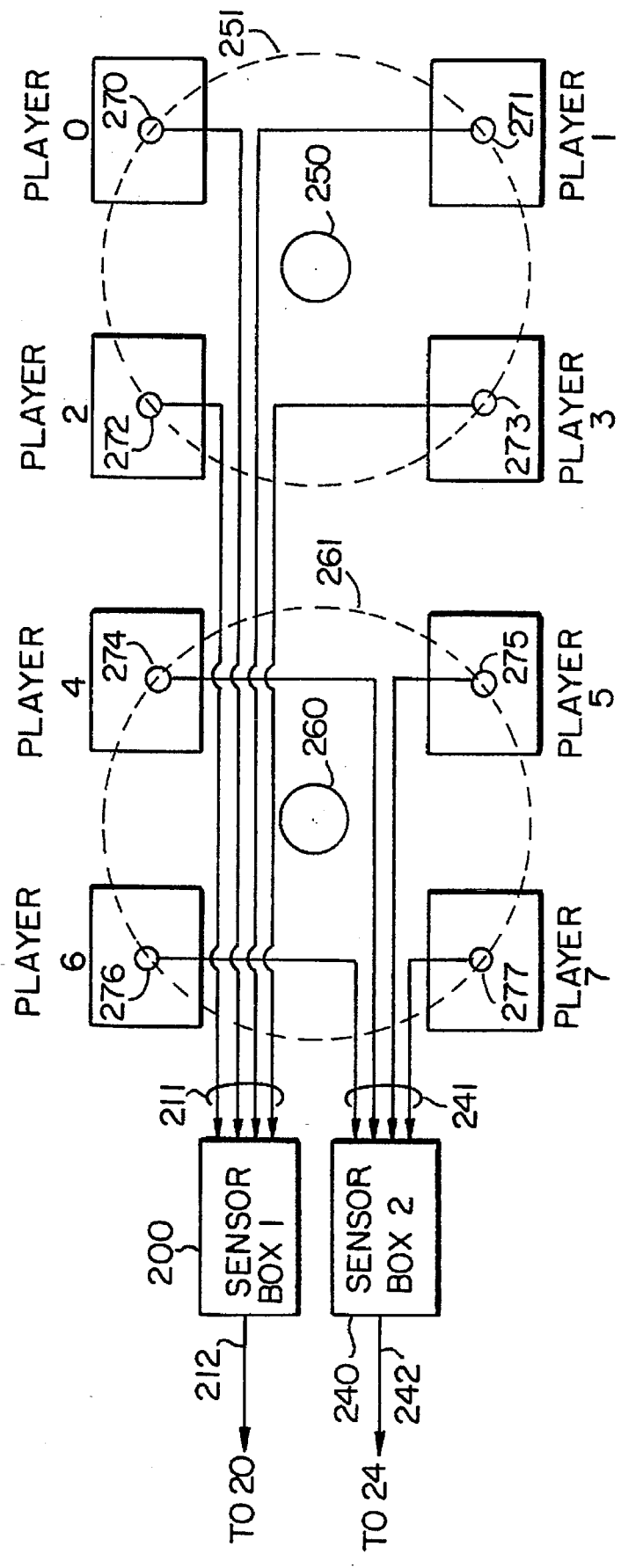
FIG. 4 is a drawing that explains a structure example of the position sensor device for obtaining a position information according to the embodiment of the present invention.

FIG. 4 is the drawing for explaining the structure of the position sensor device that obtains each position information of the players 0–7 in the embodiment. In FIG. 4, the first position sensor unit 200 detects the position information of the players 0–3 as four channel position information. The second position sensor unit 240 similarly detects the position information of the players 4–7 as four channel position information.

The way of the detection in the first and second position sensor units 200, 240 is as follows. 250 and 260 are magnetic field generators that generate each magnetic field 251 and 261. 270–277 are the position information generation devices that are built in the corresponding head mounted display device 15. Each of the position information generation devices 270–277 has magnetic field detection coil in three directions of X, Y and Z therein so that the detection signal based on the crossing of the coil to the magnetic field 251 or 261 generated by the magnetic field generator 250, 260 is output. Therefore, each detection signal from the position information generation devices 270–277 changes according to the direction of the magnetic field detection coils in 3 directions of each devices 270–277 that is built in each of the head mounted display devices 15 for the players 0–7. Then, the magnetic field detection signal from the position information generation devices 270–277 changes according to the position of the head of the players 0–7 or the direction of the players that is the position of the head mounted display devices 15.

The first and second position sensor units 200 and 240 receive the magnetic field detection signal from the position information generation devices 270–277 so as to be able to detect the movement of the players 0–7. In the present embodiment, especially, the first and second position sensor units 200 and 240 execute signal processing so as to detect the right or left direction of the head of the players 0–7 based on the magnetic field detection signal from the position information generation devices 270–277.

The above magnetic field generator 250, 260, the position information generation device 270–277 built in the head mounted display device 15 and the position sensor unit 200, 240 are publicly available as the system of "FASTRAK", registered trademark from Polhemus, Inc. Colchester, Vt., U.S.A. The present embodiment is characterized in that the movement of the players 0–7 is detected magnetically through the system "FASTRAK". The system "FASTRAK" can detect six position information of the players head wearing the head mounted display device 15, i.e. six-degree-freedom including position, X, Y and Z Cartesian coordinates, and orientation, azimuth, elevation, and roll. The reason for using two position sensor units 200, 240 is that according to the "FASTRAK" system, each position sensor unit 200, 240 can connect only 4 position information generation devices thereto.

Figure 5:
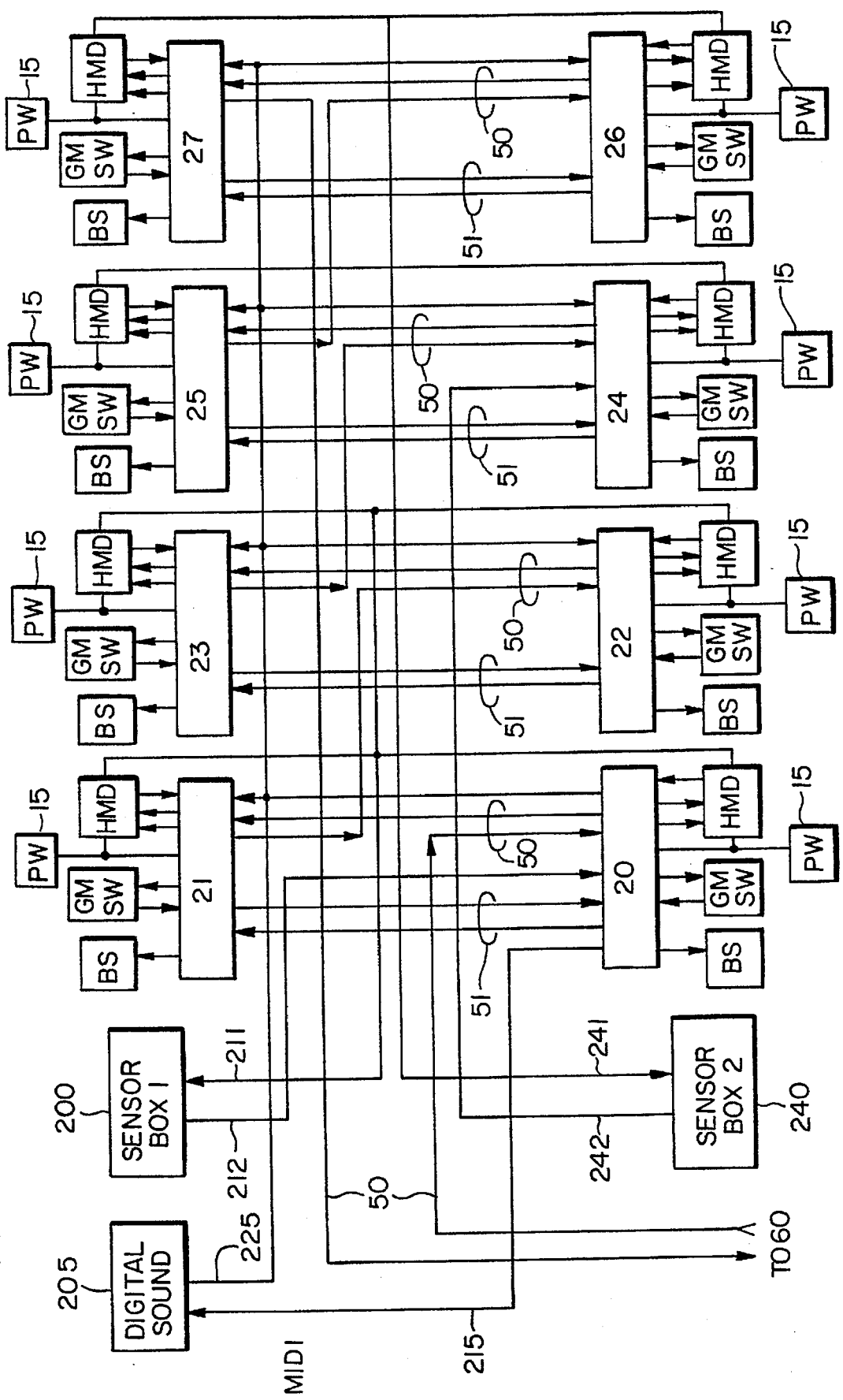
FIG. 5 is a detailed block diagram No. 1 of the structure in the embodiment of the present invention.
Figure 6:
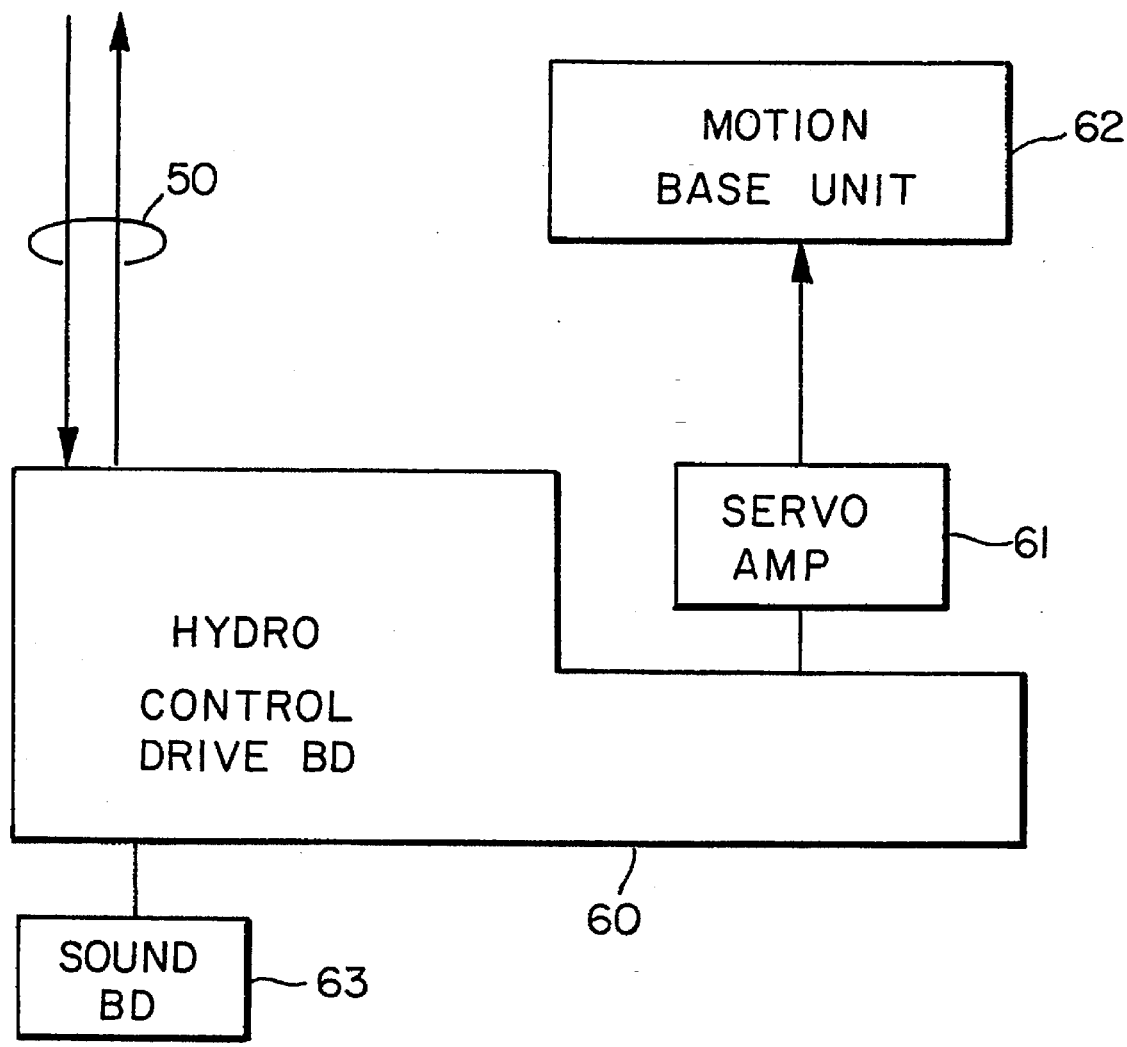
FIG. 6 is a detailed block diagram No. 2 of the structure in the embodiment of the present invention.

FIGS. 5 and 6 are the detailed block diagrams of the embodiment briefly explained in FIGS. 2 and 4.

In FIG. 5, 20–27 are the player control units corresponding to each of the players 0–7 that are installed in the box under the seat of the player shown in FIG. 1. As explained in FIG. 2, the player control units 20–27 are basically identical structure. FIG. 5 shows an example in which the position sensor units 200, 240 are provided outside of the player control units 20 and 24. Further in FIG. 5, HMD connected to each player control unit 20–27 is the head mounted display device 15, PW is a power supply, GM-SW is a game switch and display. BS is a transducer that reproduces a collision in the game. In the present embodiment, "BODYSONIC" (trademark of Bodysonic Inc.) is used as the transducer.

The power supply PW supplies the power to the head mounted display device 15 and the player control units 20–27. The game switch and display GM-SW includes the key input device 16 shown in FIG. 1 as having the button switch that the player operates and LED that displays in response to the condition of the button switch. Further, the BODYSONIC BS is installed in the seat of the player so as to give an effect to the player through sound pressure.

As explained above, the first position sensor unit 200 receives the magnetic field detection signal through the bus 211 from the position information generation device 270–273 in the head mounted display device 15 that is connected to the corresponding player control unit 20–23 for the players 0–3. Similarly, the second position sensor unit 240 receives the detection signal through the bus 241 from the position information generation device 274–277 in the head mounted display device 15 that is connected to the corresponding player control unit 24–27 for the players 4–7.

The position information for the players 0–3 detected by the first position sensor unit 200 is sent through a signal line 212 to the player control unit 20 for the player 0. And the detected position information is sent through the signal line 50 to the other player control units 21–23 in sequence as the data format shown in FIG. 3. Similarly, the position information for the players 4–7 detected by the second position sensor unit 240 is sent through a signal line 242 to the player control unit 24 for the player 4. And the detected position information is sent through the signal line 50 to the other player control units 25–27 in sequence as the data format shown in FIG. 3.

Since the packet position for each player control unit in the data format of FIG. 3 is already defined, each control unit can obtain the position information of the players in the corresponding packet position.

205 is a digital sound circuit that generates digital sound based on MIDI data sent through the signal line 215 from the digital audio circuit 203 in the player control unit 20. And the digital sound circuit 205 sends the digital sound signal to each of the player control units 20–27 through the bus 225. The digital sound is amplified by an amplifier in the control unit and supplied to the players with effect sound or background sound through the speaker of the head mounted display device 15 in synchronous to the game story as explained later.

Further in the embodiment, signal lines 51 are provided between the player control units 20–21, 22–23, 24–25, and 26–27 so that the players next to each other 0–1, 2–3, 4–5, and 6–7 can have a conversation. Through these signal lines 51, the voice of one player, e.g. the player 0, sent through the microphone in the head mounted display device 15 is output through the speaker in the head mounted display device 15 of another player 1. On the other hand, the voice of another player 1 is output through the speaker of the head mounted display device 15 of the player 0.

FIG. 6 shows a part of the control unit of the game apparatus on the embodiment of the present invention that has a function for mainly controlling the pitching and rolling of the spaceship shown in FIG. 1. 60 is a hydraulic control unit. The hydraulic control unit 60 is connected to the signal line 50 through which the data 30 of FIG. 3 is sent to the player control units 20–27. And the players' data from the player control units 20–27 is terminated to the hydraulic control unit 60 through the line 50. Since the players' data includes a timing signal synchronous to the game proceeding, the hydraulic control unit 60 can provide a control signal to the motion base unit 62 through the servo amplifier 61. The motion base unit 62 controls the oil pressure sent to each hydraulic cylinder 13 in synchronous to the predetermined control signal from the control unit 60. Therefore, the spaceship in FIG. 1 is given the predetermined movement in synchronous to the game proceeding.

Further in FIG. 6, 63 is a sound circuit that provides the game apparatus environment in which the game apparatus is installed with an announcement, effect sound, and background sound based on the players' data with the timing signal that is sent from the player control units 20–27 through the signal line 50.

Figure 7:
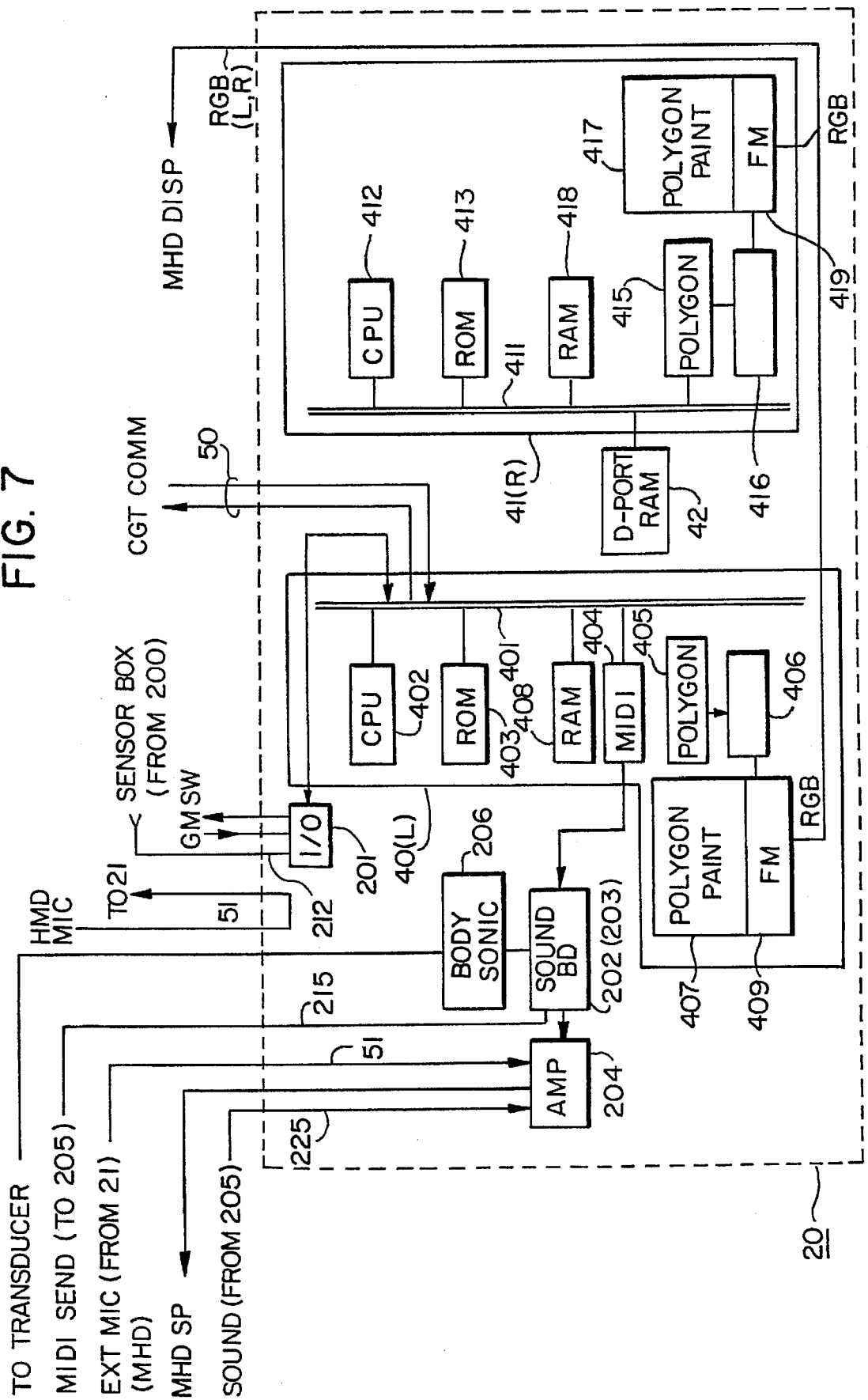
FIG. 7 is a block diagram that shows a detailed structure of the player control unit in the embodiment of the present invention.

FIG. 7 is a block diagram that shows a detailed structure of the player control unit 20–27. The player control unit 20 is shown as the representative. The structure and the function of the unit 20 will be explained assuming an embodiment in which plural players are on board the spaceship and play game of shooting in a space.

In FIG. 7, the player control unit 20 comprises the first control device 40 for the left eye and the second control device 41 for the right eye as shown in FIG. 2. The first control device 40 comprises CPU 402, ROM 403, MIDI sound source circuit 404, a polygon parameter memory 405, a display video coordinates conversion circuit 406, a polygon paint execution circuit 407, and a work RAM 418 that are connected to bus 401. On the other hand, The second control device 41 comprises CPU 412, ROM 413, a polygon parameter memory 415, a display video coordinates conversion circuit 416, a polygon paint execution circuit 417, and a work RAM 418 that are connected to bus 411. The first and second control devices 41 and 41 are connected through the dual port RAM 42 so as to communicate to each other a signal that includes each player's data and the timing signal shown in FIG. 3 sent through the signal line 50.

Further, as peripheral devices, the control unit 20 comprises I/O circuit 201, sound circuit 202 (203), sound amplifier 204, and bodysonic circuit 206 as a vibration driver. CPU 402, 412 in the first and second control units 40, 41 execute a game program stored in the ROM 403, 413. The ROMs 403, 413 store the program for executing the common game and the video data that is displayed in accordance to the game proceeding as explained later. Therefore, actually the ROM 403, 413 may be separately provided as a ROM for the program data and a ROM for the video data. The work memory RAMs 408, 418 store a data of the proceeding game.

The polygon parameter memories 405, 415 store the position of the player, i.e. a front portion of spaceship as imaged like the player boarding on, and the position information of enemy as target and another display picture as polygon data in the form of three dimensional coordinates. The polygon data means position information data on the three dimensional coordinates of each of polygon elements through which a three dimensional object is structured. The object is considered as an aggregation of the plural polygons.

The display video coordinates conversion circuits 406, 416 are the processors that execute the coordinates conversion in order to display the polygon data in the form of three dimensional coordinates stored in the polygon parameter memories 405, 415 on the two dimensional display plane of the LCD. The display video coordinates conversion circuits 406, 416 have memories, RAM and ROM, not shown in FIG. 7. The coordinates conversion is executed based on a program stored in the ROM and the RAM stores predetermined data during the conversion procedure.

The polygon data in the form of two dimensional coordinates converted by the display video coordinates conversion circuits 406, 416 is transferred to the polygon paint circuits 407, 417. The display video coordinates conversion circuits 406, 416 write the above polygon data in the form of two dimensional coordinates into the frame buffer memory 409, 419 connected thereto. The polygon data in the form of two dimensional coordinates includes R. G. B. elements data, i.e. Red, Green, and Blue. After all polygon data is written in the frame buffer memory by the polygon paint circuit 407, 417, the RGB data is sequentially read out to transfer the data to each of the color LCDs for left and right eyes in the head mounted display device 15.

As explained above, the first and second control devices 40, 41 have a similar structure as a base control circuit of ordinary video game apparatus. And the input signal from the signal line 50 corresponds to control signal input through a keyboard by the operation of the player in the video game apparatus.

The sound output from the first and second control devices 40, 41 is sent to the sound circuit 202 through the MIDI sound source circuit 404. In FIG. 7, the sound circuit 202 includes the digital audio circuit 203 in FIG. 2. That is, the sound circuit 202 converts a MIDI signal from the MIDI sound source circuit 404 into analog sound which is sent to the sound amplifier 204. At the same time, the sound circuit 202 has the function of the digital audio circuit 203 in FIG. 2 that sends the MIDI signal through the signal line 215 to the digital sound circuit 205 in FIG. 5 as MIDI sound source data.

As explained above, the digital sound circuit 205 generates analog audio signal based on the MIDI sound source data sent from the player control unit 20 through the bus 215 and sends out the analog audio signal to the sound amplifier 204 in each player control unit through the bus 225.

The signal from the sound circuit 202 and the analog audio signal sent through the bus 225 are amplified by the sound amplifier 204 so as to be sent out to the speaker in the head mounted display device 15. The sound signal from the sound circuit 202 is unique sound for each player like ignition sound of a gun emitted through pushing the game switch 16 by the corresponding player and strike sound of a bullet from an enemy. On the other hand, the analog audio signal sent from the digital sound circuit 205 through the bus 225 includes a common sound for the players like game effect sound and announcement.

Further, the sound amplifier circuit 204 amplifies the input signal sent from the microphone installed in the other player's head mounted display device 15 through the signal line 51 and send it out to the speaker of the player's own head mounted display device 15. As explained in FIG. 5, according to the present embodiment, the signal lines 51 are provided between the player control units 20–21, 22–23, 24–25, and 26–27 so that the players next to each other 0–1, 2–3, 4–5, and 6–7 can communicate with each other.

FIG. 8 shows a block diagram of the head mounted display device 15 in the embodiment of the present invention. The device 15 comprises liquid crystal display plates 151 provided in from of each eye, back lights 152 for lightening the liquid crystal display plate 151, lens 153 provided between the liquid crystal display plate 151 and each eye of the player respectively, liquid crystal display plate driver circuits 155 for driving the plates 151, and back light driver circuit 156 for driving the back light 152. The HMD 15 receives the color video signal and the synchronous signal from the player control unit 20 as shown in FIG. 7 at each driver circuit 155, 156 through the connector 154 so that the liquid crystal display plate 151 and the back light 152 are driven. Further, the HMD 15 has right and left speakers 158 and microphone 159 therein. And the HMD 15 has the position information generation device 270 explained in FIG. 4 so as to detect the movement of the player. The magnetic field detection signal as the position information that is obtained based on its crossing to the magnetic field is sent to the position sensor unit 200 through the connector 157.

Next, the video picture displayed on the color liquid crystal display in the head mounted display device 15 for each player 0–7 in the embodiment of the present invention is explained.

Figure 9:
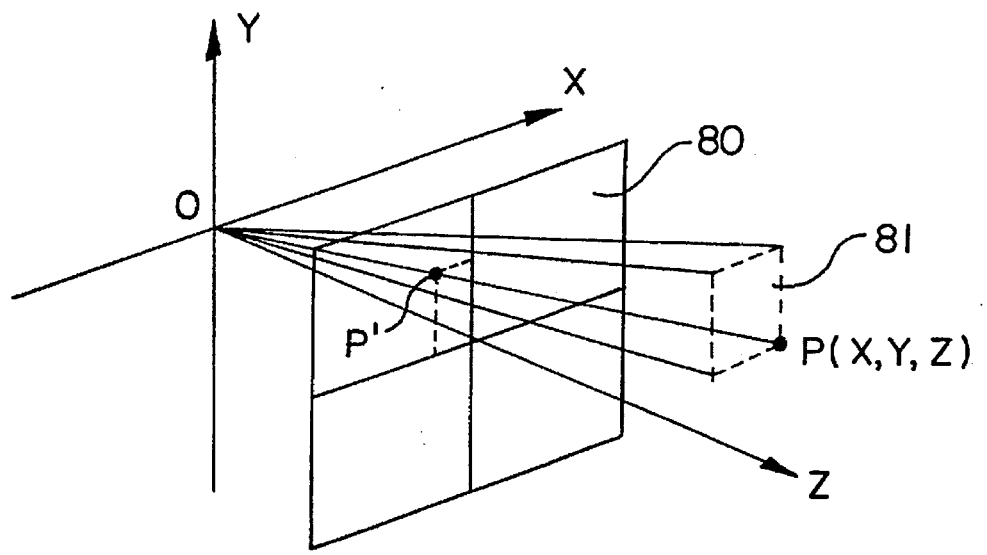
FIG. 9 is a drawing for explaining a conversion of polygon data into a two dimensional plan in the embodiment of the present invention.

FIG. 9 is a drawing for explaining the conversion of the polygon data shown in three dimensional coordinates system into the two dimensional coordinates that is basically known to the ordinary skilled persons in the art. 81 is an example of the polygon whose vertices are described in three dimensional coordinates. 80 is the two dimensional display plate of the monitor. The polygon in the form of three dimensional coordinates are projected on the two dimensional display plane 80 based on the vantage point 0. Now the three dimensional coordinates (X, Y, Z) of the point P of the polygon 81 is converted to two dimensional coordinates (x,y) of the projected point P' on the plane 80 through the conversion algorithm. The video picture that gives a virtual reality can be displayed through displaying the point P' on the display plane based on the converted two dimensional polygon data (x,y).

Figure 10:
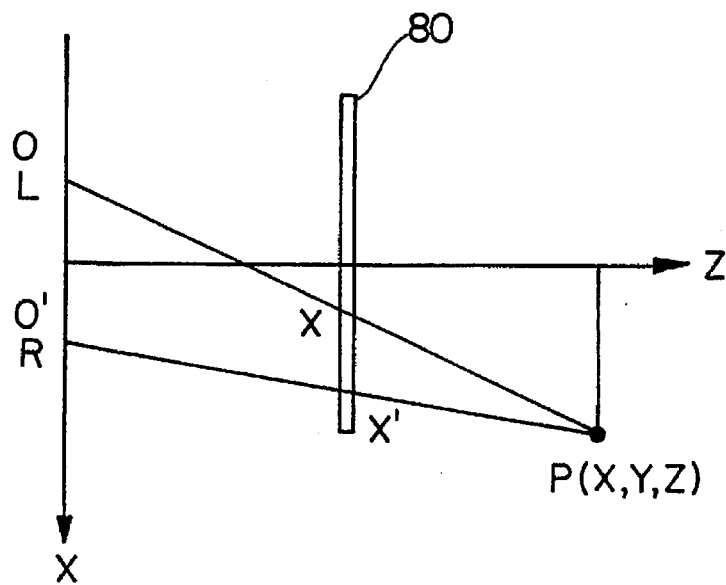
FIG. 10 is a drawing for explaining the polygon data in consideration of parallax of right and left eyes in the embodiment of the present invention.

FIG. 10 is a diagram for explaining the polygon data in consideration of parallax of right and left eyes in the embodiment of the present invention.

In FIG. 10, 80 is the two dimensional display plane of the monitor as explained in FIG. 9. The vertex P of the polygon is (X, Y, Z) in three dimensional coordinates. When projected to the two dimensional plane 80, x coordinate is X based on the vantage point O of the left eye L, whereas, x coordinate is X' based on the vantage point O' of the right eye R. As explained, the projected coordinate positions X and X' are not on the same position because of the parallax between the left and right eyes.

The coupled of the two dimensional coordinates data of the polygon that is obtained through the projection of the polygon based on each vantage point O, O' of the left and right eyes L, R is stored in the polygon parameter memories 405, 415 for each of the left eye's control device 40 and the right eye's control device 41 respectively. Base on the polygon data, the polygon is displayed on each of the LCDs for the left and right eyes individually. The player can realize a three dimensional object with a perspective sense through watching the displays. Furthermore, in accordance to the parallax, the display of the left eye's LCD may be extended toward the left side and the display of the right eye's LCD may be extended toward the right side so that a more extended video picture can be obtained.

Figure 11:
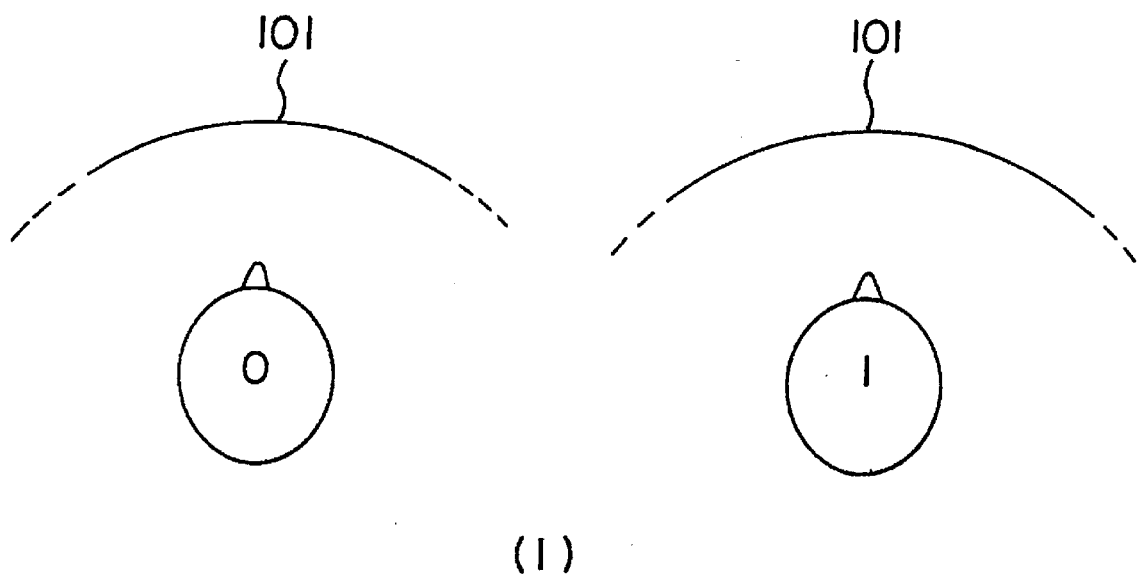
FIG. 11 is a drawing No. 1 that explains a relation between the displaying video picture and the movement of the player in the embodiment of the present invention.
Figure 11:
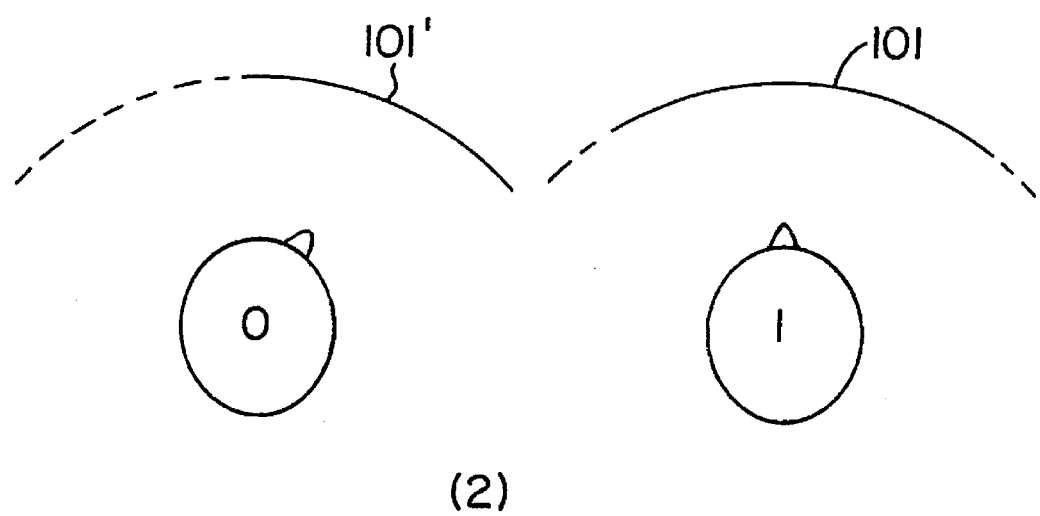
Figure 12:
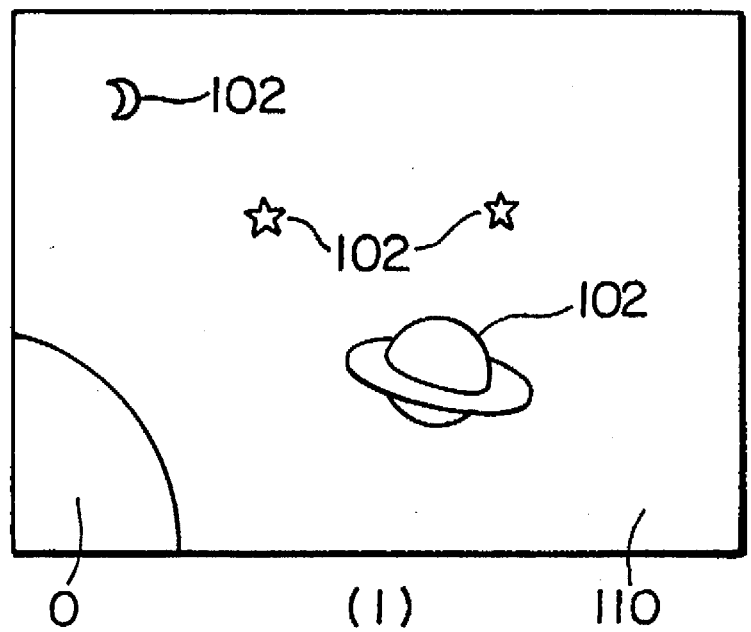
FIG. 12 is a drawing No. 2 that explains a relation between the displaying video picture and the movement of the player in the embodiment of the present invention.
Figure 12:
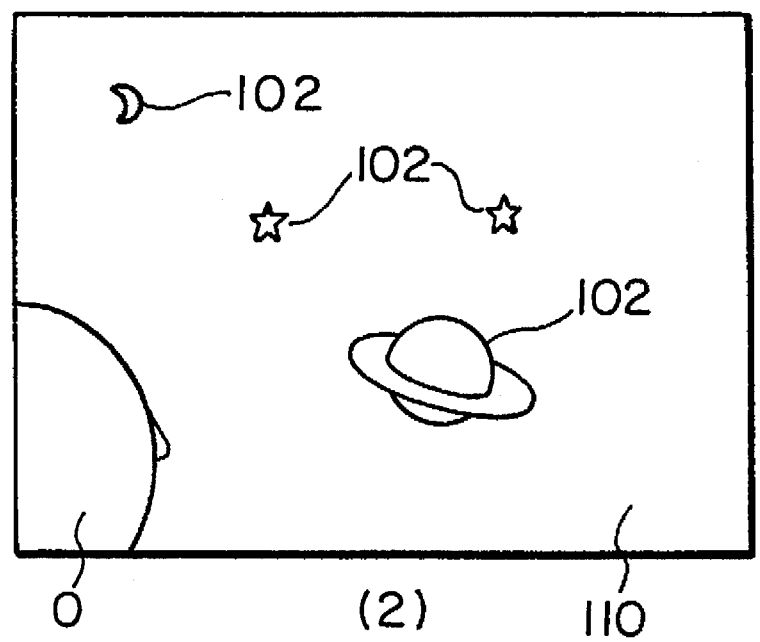

FIGS. 11 and 12 are drawings that explain an example of the relation between the displaying video picture and the movement of the players seated next to each other on the spaceship of the game apparatus and the relation between the game contents and the displaying video picture therefor.

FIG. 11 is the drawing No. 1 that explains the relation between the movement of the player and the displaying video picture. In FIG. 11 (1), the player 0 and 1 are next each other and both are looking straight ahead. In this case, the regions in the LCD of the head mounted display device 15 that the both players are watching are common, like the area of the solid line 101 in the figure.

Now it is assumed that the player 0 moves his or her head toward the right side as shown in FIG. 11 (2). The movement of the player 0 is detected and yields the change of the output from the position information generation device 270 built in the head mounted display device 15 worn by the player 0. The first position sensor unit 200 detects the movement of the player 0, i.e. the movement toward the right side or toward the player 1, based on the output of the position information generation device 270.

Then, the first position sensor unit 200 sends the data that shows the detected movement of the player 0 and the continued forward position of the player 1 to the player control unit 20 for the player 0 through the signal line 212. The player control unit 20 receives the data from the first position sensor unit 200 via the I/O circuit 201 and sends the data to the next player control unit 21 through the signal line 50 simultaneously as shown in FIG. 5. The player control unit 21 for the second player 1 receives the packet formatted data, shown as 30 in FIG. 3, from the player control unit 20 through the signal line 50. Therefore, the player control units 20 and 21 share the common data of the players 0 and 1, that is the data of his or her own and his or her partner.

The data of both players is sent to CPU 402 and CPU 412. Therefore, the CPU 402 and 412 recognize the coming data of both players in the same manner as the input control signal from the keypad in an ordinary game device and execute the program stored in ROMs 403, 413 based on the input data. That is, as shown in FIG. 11 (2), the area of the solid line 101 moves to the area of the solid line 101' in the LCD of the HMD 15 for the player 0 so that the region the player 0 is now looking for is displayed.

On the other hand, the displayed region in the LCD of the HMD 15 for the second player 1 is not changed as shown in FIGS. 11 (1) and (2). However, its displaying video picture is changed as shown in FIGS. 12 (1) and (2). In FIG. 12, 110 is the video display for the second player 1, 102 are objects in the display. In the drawing, the objects 102 are planets in space for example. O is another object that is displayed as if the player 0 at the next seat is sit down on the same spaceship. In FIG. 12 (1), the player 0 looks straight ahead as FIG. 11 (1). On the other hand, in FIG. 12 (2), the object 0 is displayed as if the player 0 is looking to the right side toward his or her partner 1 as FIG. 11 (2).

As explained above, the players 0, 1 can enjoy in the game the virtual reality of actually boarding on the spaceship. In FIG. 12, the program may be designed to display the feet of the player 1 or the control stick in the display 110 so that the player 1 can realize the virtual reality video picture from his or her eyes in a more realistic manner.

Further, the stereo sound from the speaker can also changed according to the movement of the player or the partner, that is the change of the player's picture, by a certain disposal of the stereo sound in the CPU 402, 412 in that the MIDI signal sent to the sound circuit 202 through the MIDI circuit 404 is disposed in relation to the detected position signal from the sensor units 200 and 240.

Further, in case eight players are boarding on the same spaceship as shown in FIG. 1, as an example, objects of the other seven players may be displayed in the screen of the LCD for the one player as an initial flame picture of the game so that more realistic virtual reality can be given.

The overall operation of the above game story is now explained in reference to FIGS. 2, 5, 6, and 7.

First, ROMs 403, 413 in each player control unit store the program, video information, and MIDI information of the game commonly. The player control unit 20 as representative sends the common MIDI signal from the digital audio circuit 203 through the signal line 215 to the digital sound circuit 205 so that the initial trigger is given to all player control units. In synchronous to the trigger, CPU 402, 412 on each player control unit starts the game.

Since a moving path of the spaceship boarded by the eight players and its screen are pre-stored in the game program commonly, the hydraulic control unit 60 provides the spaceship with the movement based on the common portion of the game program. Similarly, a common program of the displaying screen in the LCD of HMD 15 is stored in the ROM. At the beginning, the screen of the region shown as the solid line 101 in FIG. 11 (1) is displayed. After that, according to the position information of each player accompanied to the movement of their heads that are formatted as packet data 30, the screen is changed as shown FIG. 11 (2). As a result, each player can enjoy their own unique screen based on their own movement as a virtual reality.

Further, an unique game story like attack of an enemy is produced by the CPU and ROM according to player's own operation. As the result, each player can enjoy their own unique game story as a virtual reality.

Further, ignition sound of the gun for each player or explosion sound accompanied by attack from an enemy is produced from the speakers 158 in each HMD 15 based on a MIDI signal that comes from the MIDI circuit 404 controlled by CPU 402, 412 and ROM 403, 413 according to each player's unique operation information. As the result, each player can enjoy their own unique sound based on their own operation or movement as a virtual reality.

Further, as shown in FIG. 12 (2), the movement of the head of the partner at the next seat can be produced on the LCD in the HMD 15 by CPU's receiving the packet formatted data 30. That is, CPU 402, 412 executes the data 30 for the other players so as to send the changed polygon data to the polygon parameter memory 405, 415. As the result, the player can enjoy the game story as if the game is commonly enjoyed with other players who are in the game at the same time.

The real voice of the partner at the next seat can be heard through the speaker in the HMD.

The common video data and the unique video data to each player is converted or merged into a proper video data for display by, for example, adding both data at CPU 402, 412.

Figure 13:
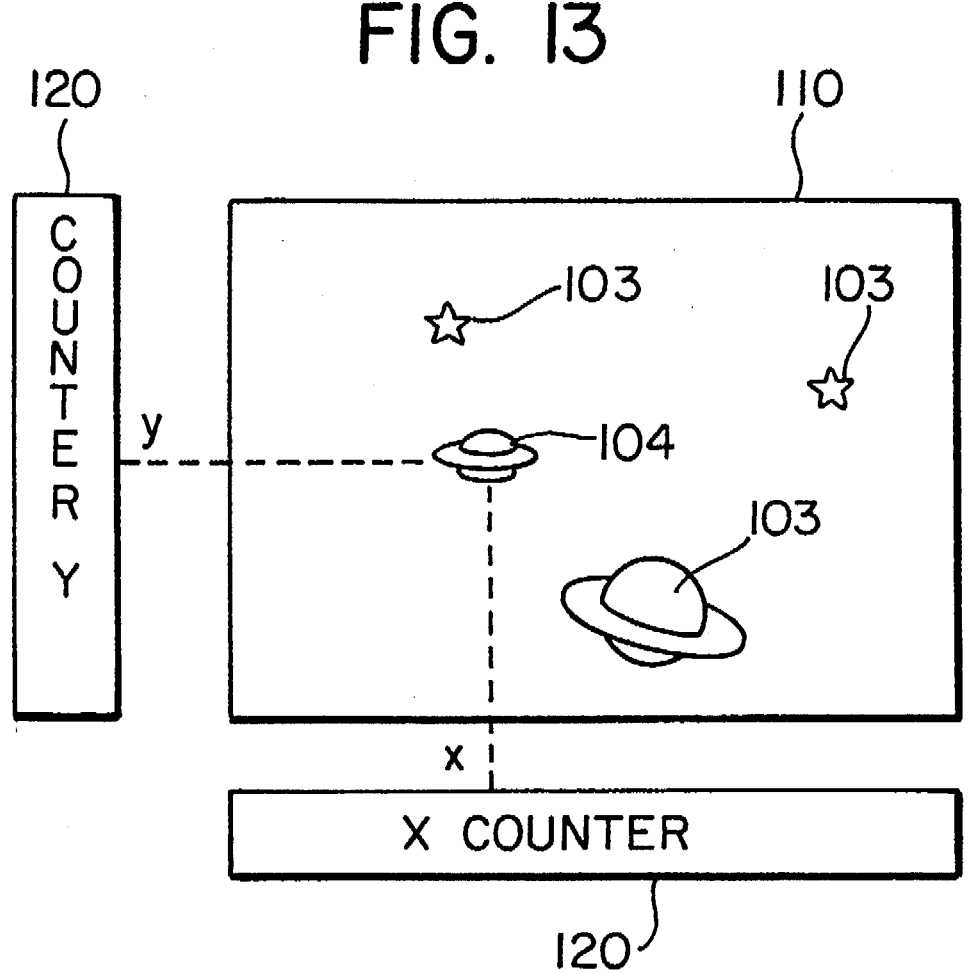
FIG. 13 is a drawing for explaining a shooting game in the embodiment of the present invention.

FIG. 13 is a drawing for explaining a shooting game in the embodiment, that is, an operation in case that the player pushes the button of the key input device 16 shown in FIG. 1 at a certain timing.

In FIG. 13, 110 is the video display and plural objects 103 including the enemy 104 is displayed in it. 120 is XYZ counter that counts XYZ coordinates corresponding to the three dimensional coordinates of the plural objects 103 including the enemy 104. The counters 120 are provided in the CPU 402, 412 of the first and second control device 40, 41. The counter for Z coordinate is omitted for simplifying.

Now, when the enemy 104 is displayed at the position of the coordinate (x, y) on the display 110, the counter 120 holds three dimensional coordinates corresponding to the position (x, y). If one of the players 0-7 pushes the button of the key input device 16 at this moment, the game switch signal is received by the corresponding player control unit 20-27 via the corresponding GM-SW circuit shown in FIG. 5. The game switch signal is received by the CPUs 402, 412 via I/O circuit 201 shown in FIG. 7. The CPUs 402, 412 decide if the cursor position in the LCD on the HMD 15 at the input timing of the game switch signal is coincident with the XYZ coordinates in the XYZ counter 120 that shows the position of the enemy 103. If they are coincident, explosion video picture is produced based on the game program stored in the ROM 403, 413 that shows the success of the shooting. The cursor position is fixed at the center of the scope of the player's vision that moves on the screen according to the movement player's head and recognized by the CPU in each player control unit.

As explained before, the main control device 60, shown in FIGS. 2 and 6, controls the movement like pitching or rolling of the spaceship in synchronous to the game proceeding. Therefore, the players can experience the virtual reality shooting game as if they board the spaceship and face to and shoot the enemy coming in the space.

Although the above embodiment is explained as an interactive game in which the voice of the next player is communicated and the movement of the next player is affected in the video picture in its own display, the present invention is not limited to this manner and cover the game interactive among all the players boarded on the same spaceship.

As explained with reference to the embodiment above, according to the present invention, the movement of one player can be affected to the video picture in the display for the other players as if the players share the same time and space. Therefore, the player can experience the video game interactive between the players as more realistic virtual reality unlike the previous video game played by an single player only.

What is claimed are:

1. A game apparatus for a plurality of players comprising:
   a plurality of video display devices provided to each of said players for displaying video which is watched by each of the players;
   a position sensor device for detecting the position of each of the players and for outputting a position information signal for each of the players; and
   a plurality of player control units, operatively connected to each of said video display devices and said position sensor devices, for controlling said video display of the corresponding video display devices;
   wherein, in response to said position information signal of a first player detected by said position sensor device, said player control units for each of the other players control corresponding video display devices to provide a video picture of the first player in the displaying video watched by at least some of each of the other players with any corresponding change of the first player video picture based on a movement of the first player.

2. A game apparatus according to claim 1, further comprising:
   a simulated vehicle for having the players board;
   a driver structure provided under the simulated vehicle for moving the simulated vehicle; and
   a control unit for controlling the driver structure so as to provide the simulated vehicle with a predetermined movement in synchronous with the content of the displaying video of the video display device.

3. A game apparatus according to claim 1, wherein said plurality of player control units are connected in tandem through communication lines, and the position information signal of said one player detected by said position sensor device is sent to the player control units through said communication lines sequentially.

4. A game apparatus according to claim 3, further comprising:
   a simulated vehicle for having the players board;
   a driver structure provided under the simulated vehicle for moving the vehicle; and
   a control unit for controlling the driver structure so as to provide the simulated vehicle with a predetermined movement in synchrony to the content of the displaying video of the video display device.

5. A game apparatus according to claim 1, further comprising a plurality of head mounted display devices, one head mounted display device mounted on each head of the players;

said video display device being installed in the corresponding head mounted display device and having a pair of monitors provided in front of a pair of eyes of the player; and said position sensor device having a plurality of position information generation devices, one each installed in each of the head mounted display devices, for generating a detected output which includes a change in a predetermined magnetic field based on a movement of the player, said position sensor device detecting the movement of the player based on the detected output from the position information generation device.

6. A game apparatus according to claim 5, further comprising:

a simulated vehicle for having the players board;

a driver structure provided under the simulated vehicle for moving the simulated vehicle; and a control unit for controlling the driver structure so as to provide the simulated vehicle with a predetermined movement in synchrony to the content of the displaying video of the video display device.

7. A game apparatus according to claim 5, wherein each of said plural player control units further comprises first and second control device for controlling each of the pair of monitors, each of the first and second control devices comprises a program memory for storing a game program, a central processing unit operatively connected to the game memory for executing said game program, and a video memory connected to the central processing unit, and each of the first and second control devices controls the video display of the corresponding monitor according to said game program.

8. A game apparatus according to claim 7, further comprising:

a simulated vehicle for having the players board;

a driver structure provided under the simulated vehicle for moving the simulated vehicle; and a control unit for controlling the driver structure so as to provide the simulated vehicle with a predetermined movement in synchrony to the content of the displaying video of the video display device.

9. A game apparatus according to claim 2, wherein each of the pair of monitors displays video based on video data of two-dimensional coordinates which is converted from polygon data of three-dimensional coordinates through projection of the polygon data on a two-dimensional plane perpendicular to a cone of vision for each vantage point of the eyes.

10. A game apparatus according to claim 7, further comprising:

a simulated vehicle for having the players board;

a driver structure provided under the simulated vehicle for moving the simulated vehicle; and a control unit for controlling the driver structure so as to provide the simulated vehicle with a predetermined movement in synchrony to the content of the displaying video of the video display device.

11. A game apparatus for a plurality of players comprising:

a simulated vehicle for having the players on board;

a driver structure provided with the simulated vehicle for moving the imitated vehicle;

a plurality of head mounted display devices provided for being mounted respectively, one on each head of the players;

a plurality of video display devices, each of which is installed in said head mounted display devices, having a pair of monitors provided in front of a pair of eyes of the player;

a position sensor device having a plurality of position information generation devices, installed in each of said head mounted display devices, for generating a detected output according to the position of the head of the player, and a position sensor unit, operatively connected to said position information generation devices, for receiving said detected output and outputting a position information signal for each of the players;

a plurality of player control units, each player control unit operatively connected to one of said video display devices and said position sensor unit and operatively connected to each other, for providing a video signal to the corresponding video display device and for sharing said position information signal for each of the players;

said player control unit further having a memory storing a game program, and executing said game program in synchronous with each other player control unit so as to output said video signal based on said game program;

wherein according to said position information signal of a first player received from said position sensor unit, said player control unit for each of the other players is provided with said video signal for displaying an image of the first player so that the image of the first player changes based on a movement of the head of the first player; and a driver control device, operatively connected to said player control units, for controlling said driver structure in synchronous with said execution of the game program.

12. A game apparatus according to claim 11, wherein said plural player control units are connected in tandem through communication lines, and the position information signal of said one player is sent from said position sensor unit to one of the player control units and is further sent to the player control units through said communication line sequentially.

13. A game apparatus according to claim 12, wherein said position sensor unit generates said position information signal in a packet format which includes position information signals for a plurality of players, and said packet formatted signal is transferred among said player control units through said communication lines.

14. A game apparatus according to claim 13, wherein said drive control device is connected in a tandem network of the player control units, and each of said player control units provide control data for the movement of the simulated vehicle and adds said control data into said packet formatted signal so that the driver control device receives said movement control data.

15. A game apparatus according to claim 12, wherein said driver control device is connected in a tandem.

16. A game apparatus according to claim 11, wherein in response to said position information signal of the first player, said player control unit provided for the first player provides said video signal so that the displaying video for the first player changes based on the movement of the head of the first player.

17. A game apparatus according to claim 11, wherein said head mounted display device for each player further comprises a microphone and a speaker which are operatively connected to the player control unit for each of the other players so that each player communicates to each other through said microphone and speaker.

18. A game apparatus for a plurality of players to simulate a common video experience that can be subjectively modified by each player, comprising:

a plurality of video display devices, one for each player, each video display device providing a display screen that covers the eyes of the viewing player and presents a video scene;

means for determining the relative position of each of the players' heads and providing corresponding position signals; and means for generating video images on the video display device including a simulated video image of each of the other players that are positioned in the video scene in response to the position signal, and a video scene that is presented relative to the position signal of the viewing player's head, whereby the viewing player can alter the video scene by movement of the viewing player's head and can be aware of the orientation of the other players' heads by their simulated video images in the video scene.

19. A game apparatus according to claim 6, further comprising:

a simulated vehicle for having the players board;

a driver structure provided under the simulated vehicle for moving the simulated vehicle; and a control unit for controlling the driver structure so as to provide the simulated vehicle with a predetermined movement in synchrony to the content of the displaying video of the video display device.

20. The game apparatus according to claim 18 wherein the video display devices include a head-mounted display device and a microphone and a speaker wherein a player can communicate with another player.

21. The game apparatus according to claim 20 further including means for generating audio, the audio being varied in response to a corresponding position signal.

22. The game apparatus according to claim 20 further including a support member having a plurality of seats for the players and means for moving the support member in coordination with the video scene.

23. The game apparatus according to claim 21 wherein each head mounted display device has a monitor provided for each eye of a player to provide a difference in parallax for providing three-dimensioned video images.

24. The game apparatus according to claim 23 wherein the means for generating video images includes a player control unit for each player having a first computer unit for providing video images to a right eye and a second computer unit for providing video images to a left eye.

25. The game apparatus according to claim 23 wherein the means for generating video images includes:

a player control unit for each player having a first control device with a first computer for providing video images to a right eye and a second control device with a second computer for providing video images to a left eye, the first control device further comprising:

a sound source circuit means for providing sound;

polygon parameter memory for storing video data;

a display video coordinate conversion circuit means for creating video images from the stored video data; and a polygon paint execution circuit means for providing color to the video images;

the first control device, in response to the position signal which includes data on each player, generating both sound and video images for the right eye of the player.

* * * * *